July 11, 1933.  D. B. EVANS  1,917,639
PUMP PISTON
Filed Dec. 24, 1932
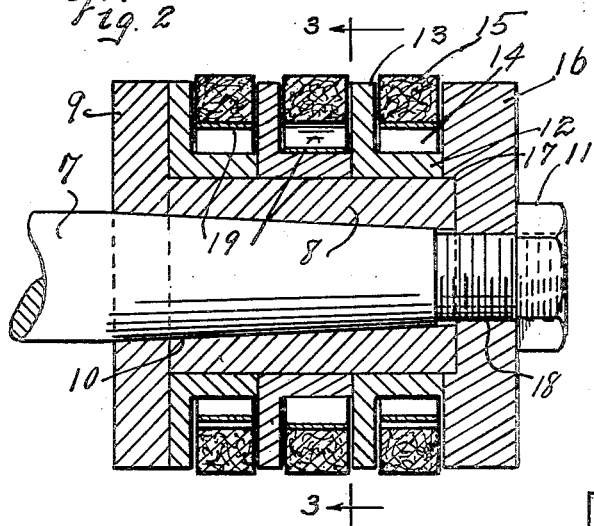
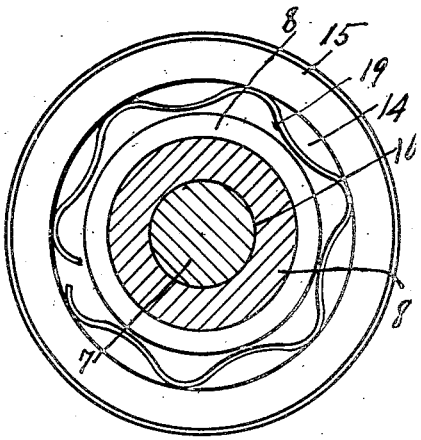
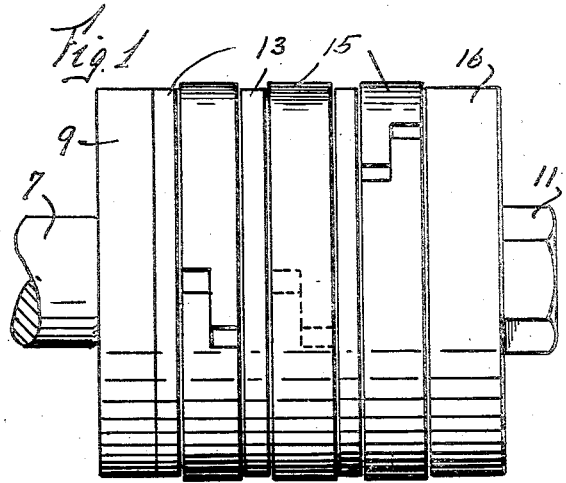
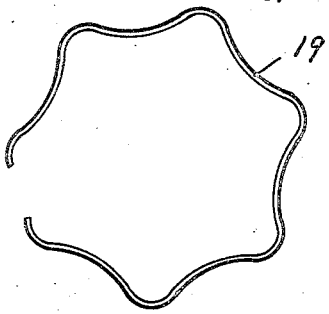
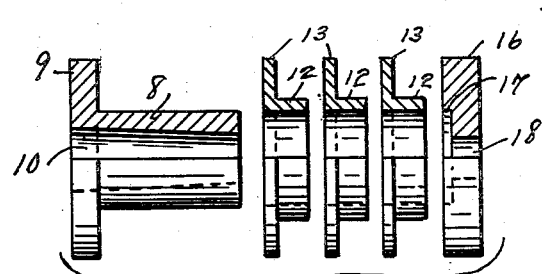
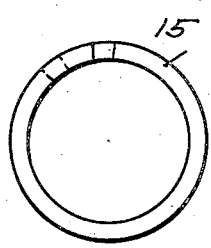
INVENTOR.
Dora B. Evans Patented July 11, 1933

1,917,639

UNITED STATES PATENT OFFICE

DORA B. EVANS, OF LONG BEACH, CALIFORNIA

PUMP PISTON

Application filed December 24, 1932. Serial No. 648,780.

My invention relates primarily to a piston for use particularly in pumps for pumping hot oil (although it is not limited to such use) and it has for its prime object the provision of a piston so constructed and arranged that the packing rings can be easily and quickly replaced when worn or otherwise rendered unfit for further use with a minimum expenditure of time and effort.

A further object is to provide a device of the above character in which the packing rings can be easily and quickly replaced or changed without the necessity for expert knowledge or the use of special tools.

A still further object is to provide a piston of the above character in which means are provided for maintaining the packing rings in close contact with the walls of the cylinder at all times as the rings wear.

Other objects and advantages will appear hereinafter and, while I have shown and will describe the preferred form of my invention, it will be understood that I do not limit myself to such preferred form but that various changes and adaptations may be made therein without departing from the spirit of my invention.

In the drawing accompanying and forming a part hereof:

Fig. 1 is a side elevation of my piston with a fragment of a piston rod upon which it is securely positioned.

Fig. 2 is a central vertical section through Fig. 1.

Fig. 3 is a section on the line 3—3 of Fig. 2.

Fig. 4 is a detailed view of the parts forming my piston in their disassembled positions.

Fig. 5 is a detailed view of one of the ring expanders or marcels used with my piston.

Fig. 6 is a side elevation of one of the rings used with my invention.

Figs. 7 and 8 are fragmentary details of one form of ring expanders.

Referring to the drawing 7 indicates a piston rod of the usual type upon the end of which my piston is mounted. My piston comprises a body member composed of the sleeve 8 having at one end an integral, outwardly extending, flange 9 and being provided with a concentric tapered opening 10 therethrough, the taper of this opening corresponding to the taper of the end of the piston rod 7 upon which it is mounted, nut 11 being provided to aid in holding the piston securely but detachably positioned upon said tapered end.

Snugly but removably mounted upon the sleeve 8 are the ring carriers each composed of the annulus 12 and an integral flange 13 positioned at one end thereof, each of these flanges 13 being of the same diameter as the flange 9 and the length of each of the annulus 12 being sufficient to form a groove or recess 14 for the reception of the packing rings 15, the flanges 13 forming or acting as the spacers between the rings, and positioned at the extreme end of the sleeve 8 opposite the flange 9 is a disc 16, a concentric recess 17 being provided in the inner face thereof for the reception of the end of said sleeve whereby said disc is held concentric with said sleeve when the same are assembled for use. An opening 18 is provided centrally through disc 16 for the passage of the end of the rod 7. Mounted within the recesses 14 are the packing rings 15. While I have shown these packing rings as being of the "step cut" type and of fabric, it will be understood that any other suitable type or material may be used if desired or found necessary. Positioned within each of the recesses 14 between the inner faces of the rings 15 and the annulus 12 are the ring expanders or marcels 19. These expanders are formed of any suitable or desired resilient material, preferably brass, the construction of which will be obvious from an inspection of Figs. 3 and 5, and act to maintain the rings at their maximum diameter and in close contact with the walls of the cylinder.

While in my preferred form I have shown my expanders with their ends free and terminating a short distance apart, in some cases it may be necessary to connect these ends to prevent relative sidewise movement while at the same time permitting relative movement lengthwise and to this end I provide (Figs.

7 and 8) an elongated slot 20 in one of the ends of the expander and in the other end I mount a rivet 21 rigidly therein, which rivet projects through the slot 20 and is headed over to prevent accidental displacement from the slot. The operation of this construction will be obvious.

In the use of my piston the sleeve 8 will be ordinarily permanently mounted upon the tapered end of the piston rod 7 and when it is desired to replace the rings the nut 11 will first be removed. The disc 16 will then be removed and then the ring carriers. The rings may then be replaced in the carriers with new rings and said carriers repositioned upon the sleeve 8, the replacement of the disc 16 and the nut 11 securely locking the members together into a complete whole.

Having described my invention what I claim is:

In a device of the character described the combination of a piston composed of a sleeve having an integral flange surrounding one end thereof and a detachable flange surrounding the other end thereof, said last flange being provided in its inner face with a concentric recess adapted to fit snugly the end of said sleeve, said sleeve being substantially smaller in diameter than said flanges, a plurality of concentric ring carriers detachably mounted on said sleeve between said flanges in fixed longitudinal adjustment each comprising an annulus having an annular concentric flange surrounding one end thereof and adapted, when positioned for use, to form a plurality of spaced ring grooves, an expandible non-metallic packing ring in each of said grooves, the inner diameter of said rings being substantially greater than the bottom diameter of the ring grooves, and a ring expander in each of said grooves behind said rings adapted to exert pressure to expand said rings, said expanders comprising a strip of relatively thin flexible undulating material of a width substantially equal to the width of the ring grooves and having its ends connected together to permit relative lengthwise but non-transverse movement.

In witness that I claim the foregoing I have hereunto subscribed my name this 19 day of December, 1932.

DORA B. EVANS.